United States Patent [19]
Lee

[11] Patent Number: 5,641,178
[45] Date of Patent: Jun. 24, 1997

[54] AIR BAG DEVICE

[75] Inventor: Sang-Hoon Lee, Kyunnam-Do, Rep. of Korea

[73] Assignee: Hyundai Motor Company, Ltd., Seoul, Rep. of Korea

[21] Appl. No.: 513,237

[22] Filed: Aug. 10, 1995

[30] Foreign Application Priority Data

Aug. 10, 1994 [KR] Rep. of Korea ............... 94-20089
Aug. 10, 1994 [KR] Rep. of Korea ............... 94-20090

[51] Int. Cl.$^6$ ....................................... B60R 21/16
[52] U.S. Cl. ............................. 280/728.3; 280/732
[58] Field of Search ..................... 280/728.2, 728.3, 280/731, 732

[56] References Cited

U.S. PATENT DOCUMENTS

| | | | |
|---|---|---|---|
| 5,342,083 | 8/1994 | Gentile et al. | 280/732 |
| 5,458,365 | 10/1995 | Rogers et al. | 280/732 |
| 5,474,323 | 12/1995 | Davidson | 280/728.2 |
| 5,520,410 | 5/1996 | Sun | 280/728.3 |

Primary Examiner—Paul N. Dickson

[57] ABSTRACT

An improved reusable air bag device for a vehicle includes an impact transformation opening door system or a lever opening door system for easily opening an air bag door when a traffic accident occurs causing vehicle impact.

9 Claims, 4 Drawing Sheets

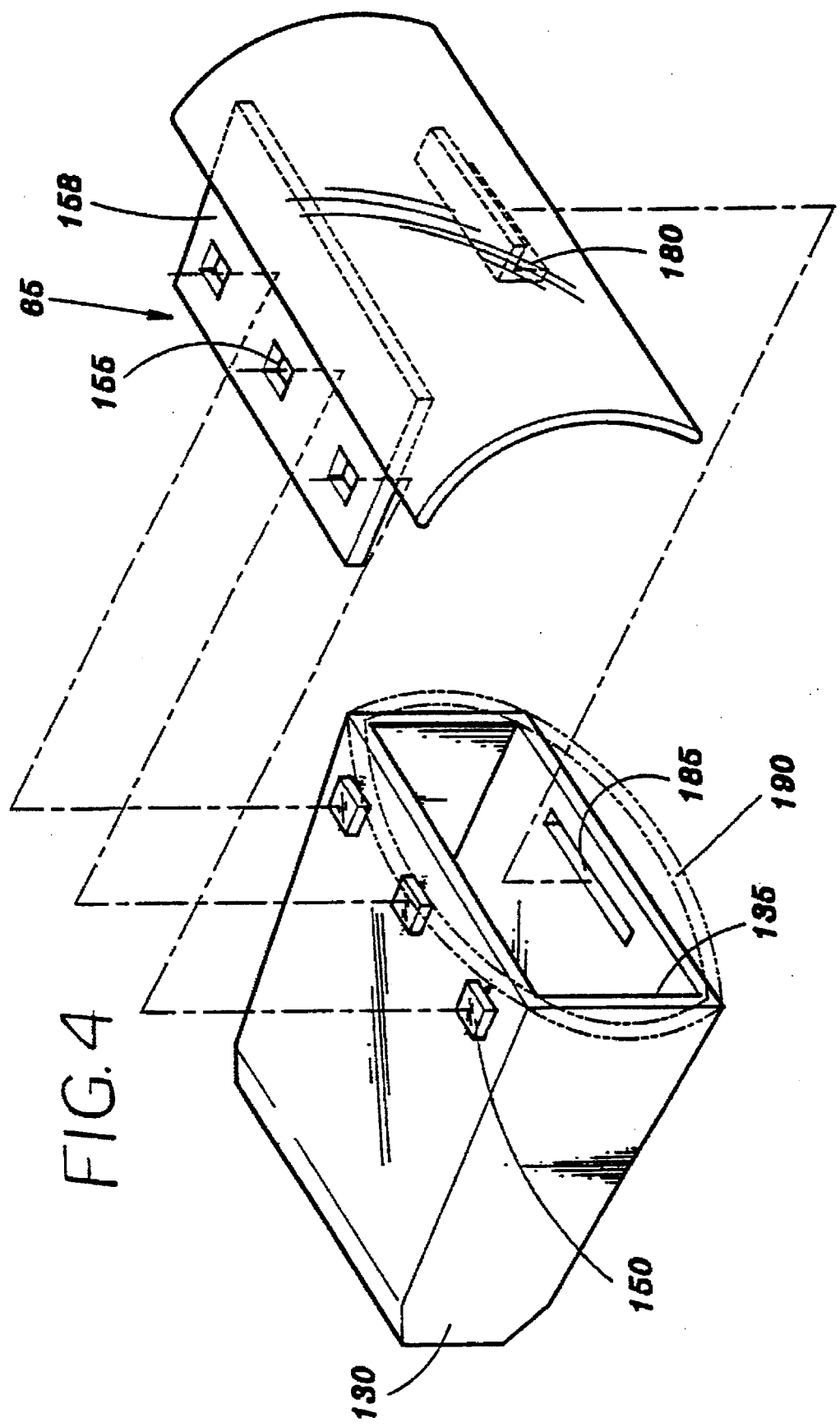

AIR BAG DEVICE

BACKGROUND OF THE INVENTION

1. Field of the Invention

The present invention relates to an improved air bag device for use in a vehicle, and more particularly, to an air bag of a vehicle which has an impact transformation opening door system or a lever opening door system for easily and effectively opening an air bag door when the vehicle undergoes an impact.

2. Description of Related Art

Various types of air bag devices for a vehicle are known in the art. Generally, most vehicles include an air bag outer skin disposed within a case which has a door core having a V-shaped tearing groove disposed on a lower connecting plate thereof.

However, the conventional air bag device suffers from a number of problems, such as, for example, the V-shaped tearing groove is very difficult to manufacture in order to have a certain thickness of about 0.4–0.5 mm. It is likely that immediate tearing at the groove may be delayed when a traffic accident occurs so that injury will result to the vehicle occupants, and the conventional device is expensive to manufacture. The difficulty in obtaining and maintaining a groove of the certain thickness correspondingly leads to either opening of the air bag door too early or too late, rather than a repetitively punctual opening of the air bag door.

As shown in FIG. 1, the conventional air bag device is disposed within an air bag mounting portion 20 of a dashboard 10 such as an instrument panel, or an air bag storage area of a steering wheel (not shown). The dashboard 10 includes a gauge panel 15, a defroster 40 and a glove box 30.

As shown in FIG. 2, the conventional air bag device includes an air bag case 130, an air bag outer skin 100 surrounding a circular tube 120 wherein the air bag outer skin 100 and the circular tube 120 are disposed within the air bag case 130, an inflator 110 disposed in the circular tube 120 for supplying a compressed air, and an air bag door 65 united with the case 130. The case 130 is connected to a cross member 50 of a panel of the vehicle (not shown) by a fixing bolt 140 and a nut 145.

The air bag door 65 is composed of a door skin 60 and a plastic door core 70 having an upper connecting plate 158 and a lower connecting plate 85. The upper connecting plate 158 has a plurality of engagement grooves 155 for correspondingly engaging with a plurality of projections 150 supported on an upper wall of the air bag case 130. The lower connecting plate 85 has a plurality of pins 90 for correspondingly engaging with a plurality of apertures 91 disposed on a lower wall of the case 130, and a plurality of V-shaped tearing grooves 80 disposed on the outer surface of the lower wall of the case for tearing when a vehicle impact occurs.

Therefore, after the vehicle impact occurs and a detonating fuse 115 is supplied with an electric current, compressed air is supplied interior of the bag outer skin 100 from the inflator 110, the tearing groove 80 tears and the door core 70 is opened outward by detonating power in the direction indicated by an arrow from the closed position to the open position shown in FIG. 2. At this time, the air bag outer skin 100 forms a kind of expanded air bag (not shown).

Thus, the conventional air bag device should have a thickness of 0.4–0.5 mm of the tearing grooves 80 for easily releasing the door 65 from the air bag case 130. However, it is very difficult to repeatedly injection mold a predetermined thickness of the tearing grooves 80, rendering the air bag device expensive to manufacture and inconsistent in operation. Thus, although the conventional air bag devices worked well for their intended purpose in a majority of impacts, it is possible that the tearing grooves 80 will not tear and the bag door will not work upon vehicle impact and may tear too late so that the driver and passengers receive bodily harm.

SUMMARY OF THE INVENTION

Accordingly, it is an object of the present invention to provide an improved air bag device for a vehicle, which eliminates the above problems encountered with the conventional air bag devices for a vehicle.

Another object of the present invention is to provide an air bag device for use in a vehicle, which includes an impact transformation opening door system or a lever opening door system for effectively and easily opening an air bag door when a traffic accident causing vehicle impact occurs.

A further object of the present invention is to provide an air bag device for a vehicle, which is simple in structure, inexpensive to manufacture, durable in use, and refined in appearance.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention is directed to an improved air bag device for a vehicle, which includes an impact transformation opening door system or a lever opening door system for easily opening an air bag door when a traffic accident causing vehicle impact occurs, such that the device is simple in structure and inexpensive to manufacture.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 4 is an exploded perspective view of the air bag device of FIG. 3 illustrating the construction of a casing and door assembly thereof according to the present invention;

DETAILED DESCRIPTION OF THE PREFERRED EMBODIMENTS

Figure 1:
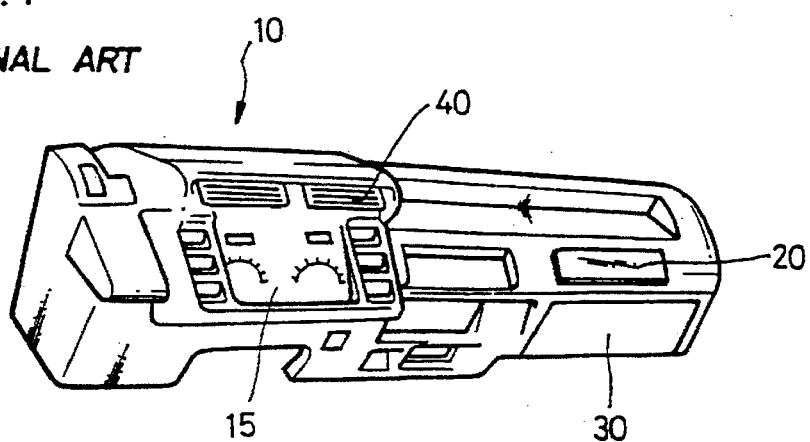
FIG. 1 is a perspective view of a conventional dashboard or instrument panel containing an air bag mounting portion.
Figure 2:
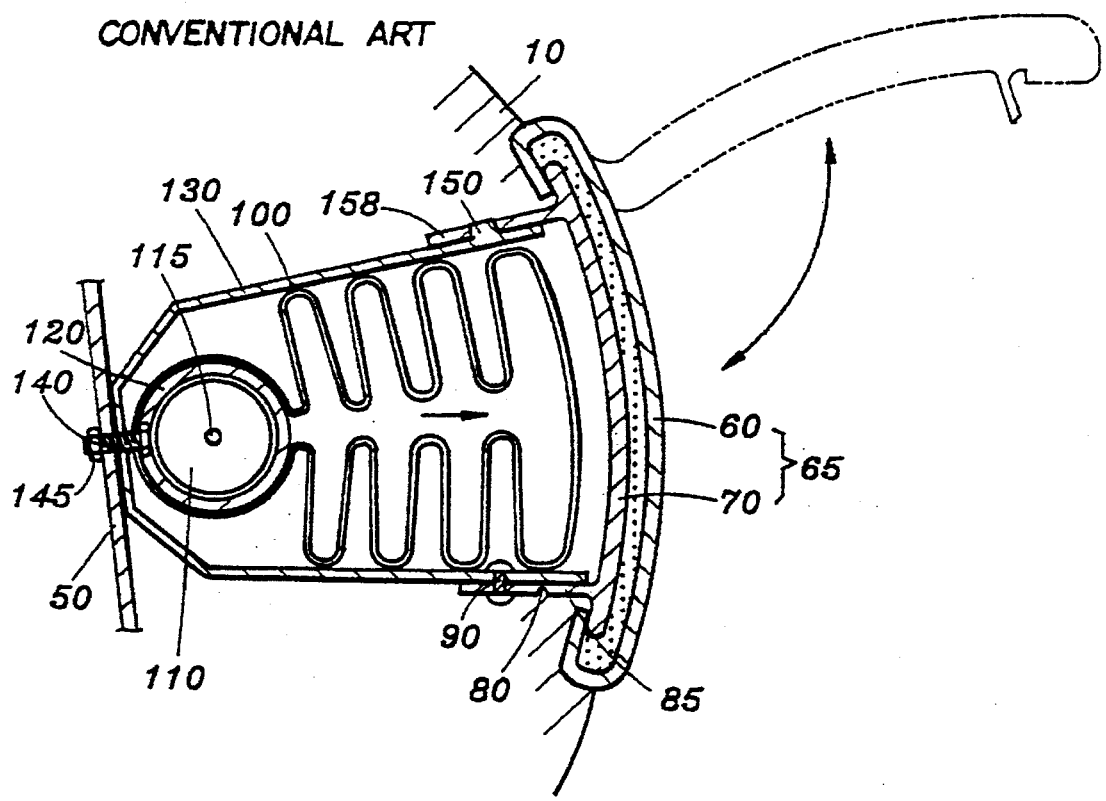
FIG. 2 is a sectional view of a conventional air bag in order to illustrate the construction thereof.
Figure 3:
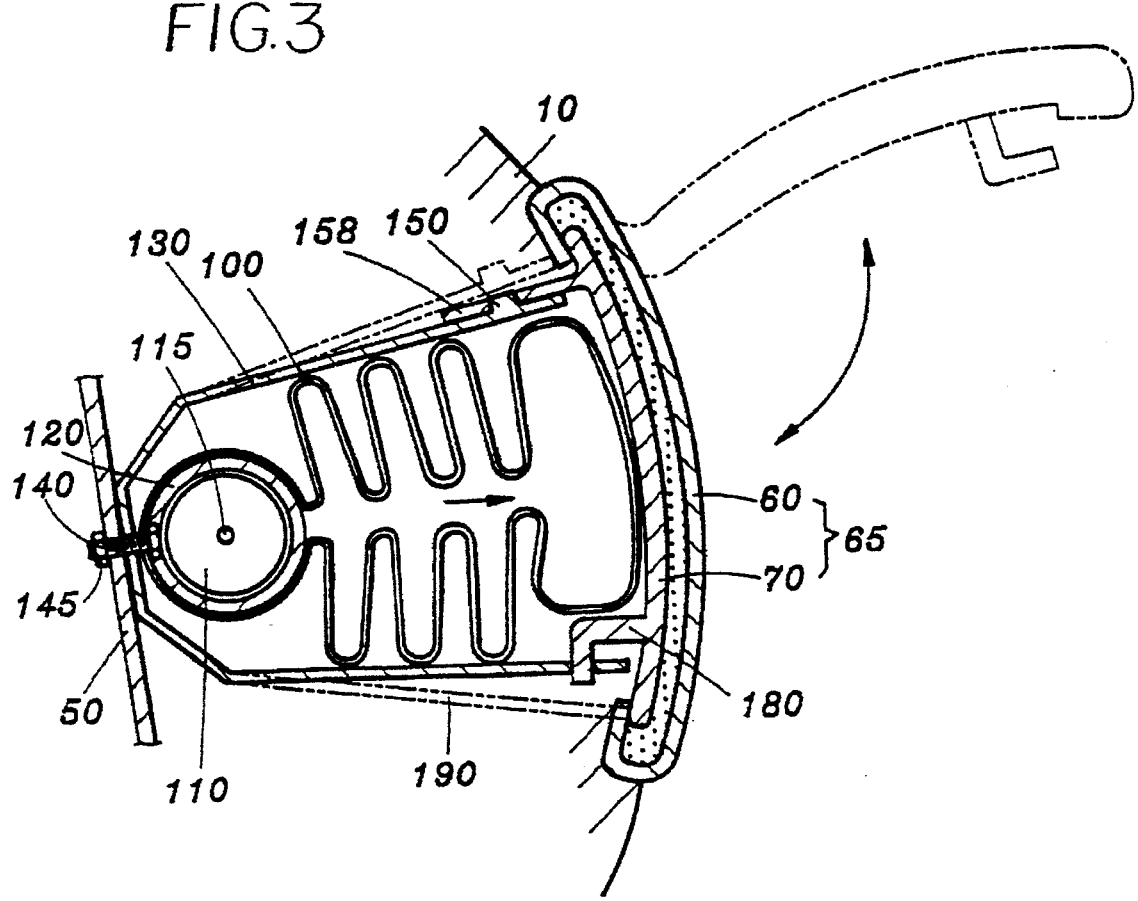
FIG. 3 is a sectional view of an air bag device according to the present invention.

Referring now in detail to the drawings for the purpose of illustrating preferred embodiments of the present invention, the air bag device as shown in FIGS. 3 and 4 comprises an air bag case 130, an air bag outer skin 100 surrounding a circular tube 120, the air bag outer skin 100 and the circular tube 120 being disposed within the air bag case 130, and an air bag door 65 operatively connected to an opening 135 of the air bag case 130 for protecting the air bag outer skin 100. The air bag case 130 is attached to a cross member 50 of a panel or frame of the vehicle by a fixing bolt 140 and a nut 145. Also, the air bag case 130 and the air bag door 65 are disposed within an air bag mounting portion 20 of a dashboard 10 and/or a steering wheel (not shown).

The air bag outer skin 100 includes an inflator 110 and a detonating fuse 115 disposed therewithin. The air bag door 65 includes a door skin 60 for covering an outer surface thereof and a door core 70 having an upper connecting plate 158 extending from an upper portion thereof and having a horizontally elongated, L-shaped projection 180 formed on an inner surface thereof.

The upper connecting plate 158 extending from the upper portion of the door core 70 includes a plurality of apertures 155 formed therethrough for correspondingly engaging with a plurality of projections 150 supported on an outer surface of an upper wall of the air bag case 130. A horizontally elongated groove or opening 185 is formed through a lower wall of the air bag case 130 and disposed adjacent the opening 135 for correspondingly engaging with the horizontally elongated, L-shaped projection 180.

As shown in FIGS. 3 and 4, the air bag device according to the present invention operates as follows. When a traffic accident causing vehicle impact occurs, the compressed air is supplied to an interior of the air bag outer skin 100 very fast by an explosive power of gunpowder by setting off the gunpowder through the detonating fuse 115. Thereafter, the air bag outer skin 100 expands very fast, so that the expanded air bag outer skin pushes against the door core 70.

At this time, the opening 135 of the air bag case 130 operates under a bell mouth phenomenon such that the opening 135 having a rectangular configuration expands in every direction to form a kind of eliptical formation as shown by dot-dash lines in FIG. 4. Also, the L-shaped projection 180 engaged with the elongated groove 185 of the air bag opening 135 is simultaneously separated from the elongated groove 185 and the door 65 is outwardly opened. Therefore, the air bag outer skin 100 expands and forms an air bag so as to prevent passenger injury.

The air bag outer skin is made of nylon fiber material for eliminating and reducing injury to the human body. The door core 70 is made of soft plastic material for similarly eliminating and reducing injury to the human body.

Accordingly, the air bag device particularly includes the L-shaped projection 180 of the door core 70 and the elongated opening 185 formed within the lower wall of the case 130 and adjacent the opening 135 so that when the traffic accident generating a vehicle impact occurs, the projection 180 is immediately separated from the elongated groove 185 and the door core 70 is simultaneously pushed outward, and the air bag outer skin expands to form an air bag. Accordingly, the air bag device of the present invention works very fast and is neither too early nor delayed during operation. The air bag device of the present invention further is easy and inexpensive to manufacture, particularly due to the fact that it is a reusable device, and is very simple in structure.

Figure 5:
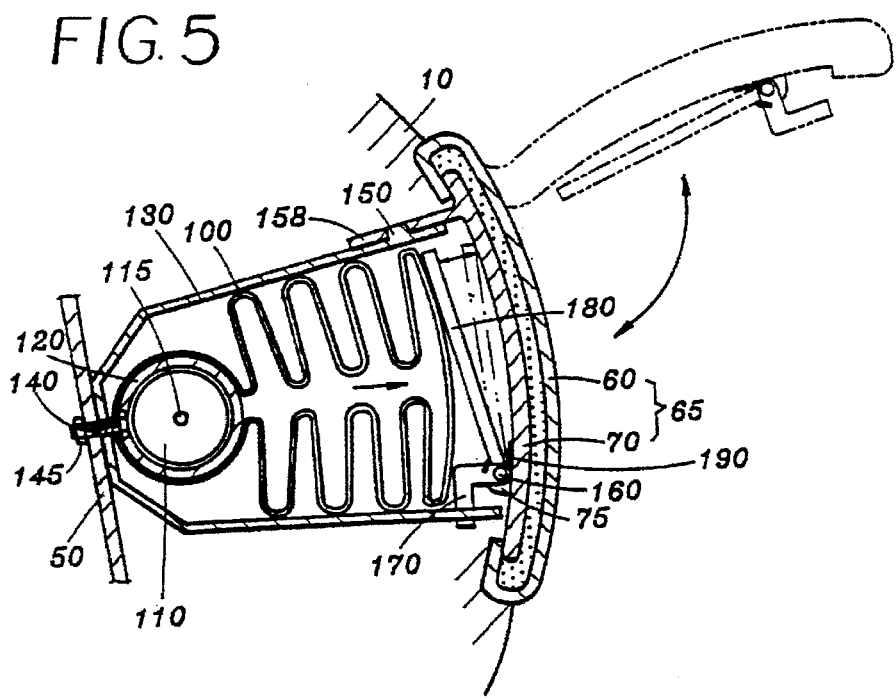
FIG. 5 is a sectional view illustrating another embodiment of the air bag device according to the present invention.
Figure 6:
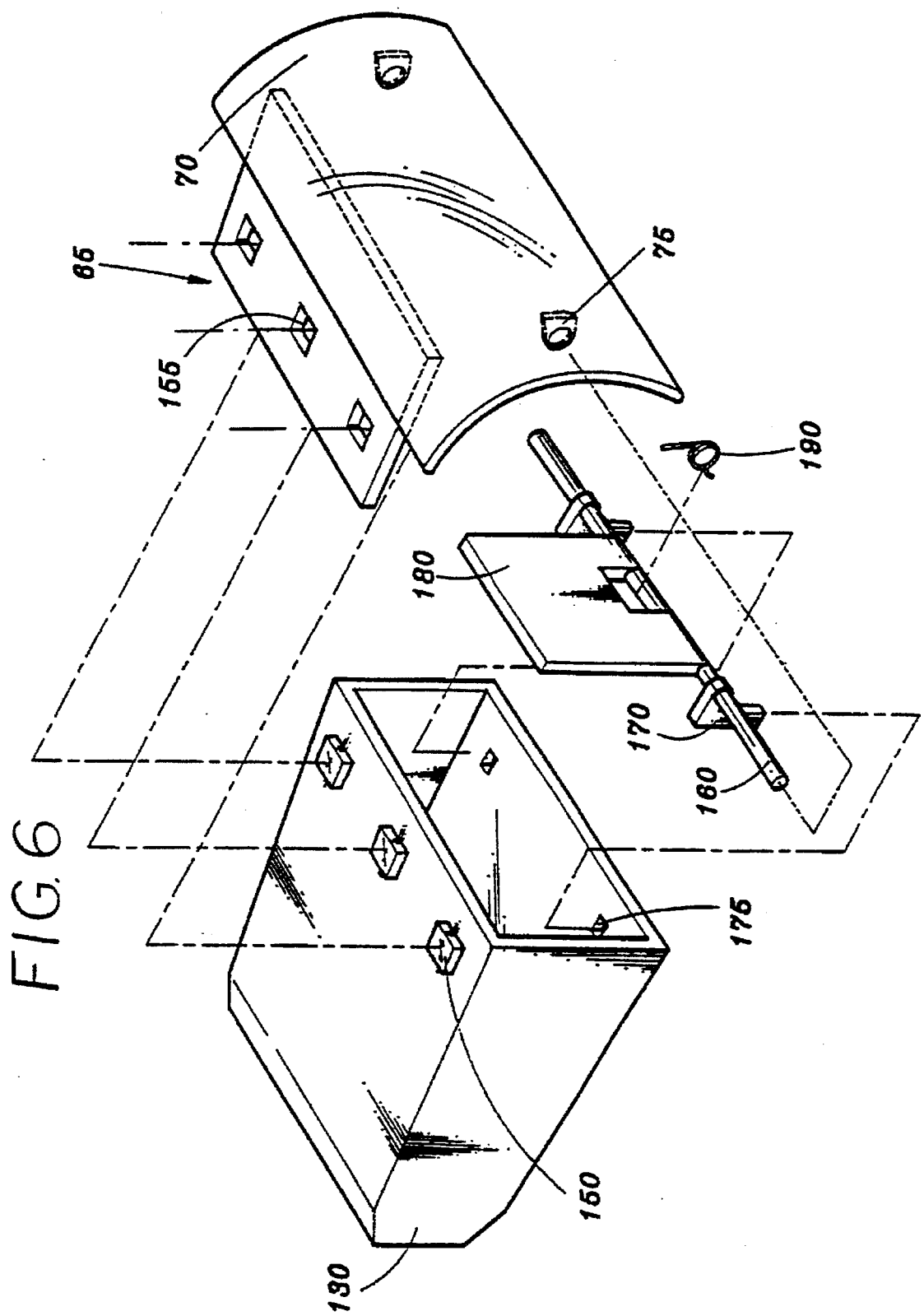
FIG. 6 is an exploded perspective view of the air bag device of FIG. 5 illustrating the construction of a casing and door assembly thereof according to the present invention.

Referring in detail to FIGS. 5 and 6, there is illustrated an additional embodiment of an air bag device in accordance with the present invention. In the additional embodiment of the present invention, all structure is the same as that of the first embodiment of the present invention except the engagement and separation mechanism of the lower wall of the air bag case 130 and the door core 70 as follows.

The air bag case 130 includes a pair of spaced lever engagement apertures 175 formed within the lower wall thereof. The lever engagement apertures 175 as shown are each spaced apart to be positioned adjacent opposing side walls of the air bag case 130, however, the structure is not limited to such a spacing. The door core 70 includes a pair of ring configured shaft supports 75 disposed on an inner surface of the lower portion thereof. A rotary shaft 160 is rotatably inserted into the pair of shaft supports 75. The rotary shaft 160 is provided with a pair of L-shaped levers 181 fixed thereto and removably inserted into the pair of lever engagement apertures 175. A pivotal plate is rotatably mounted on a substantially middle portion of the rotary shaft 160 and between both levers 181, and a spring 183 is attached to a center portion of the rotary shaft for normally biasing the door core 70 into a locked state.

As shown in FIG. 5, the second embodiment of the air bag device according to the present invention operates as follows. When a traffic accident causing vehicle impact occurs, the compressed air is supplied to the air bag outer skin 100 very fast by an explosive power of gunpowder by setting off the gunpowder through the detonating fuse 115. Thereafter, the air bag outer skin expands very fast, so that the expanded air bag outer skin pushes against the rotary plate 182 and thus against the door core 70.

At this time, the rotary shaft 160 rotates against the biasing force of the spring 183 and then the pair of levers 181 engaged with the pair of lever engagement apertures 175 are separated from the lever engagement apertures 175 and rotate in the same direction as the rotary plate 182. Therefore, the door core 70 is opened (FIG. 5), and the air bag outer skin 100 expands to form an air bag so as to prevent injury to a passenger.

The air bag outer skin is made of nylon fiber material for eliminating and reducing injury to the human body. The door core 70 is made of soft plastic material for likewise eliminating and reducing injury to the human body.

Accordingly, the air bag device particularly includes the L-shaped levers 181 of the rotary shaft 160 and the lever engagement apertures 175 formed in the lower wall of the case 130 and adjacent the opening 135, so that when the traffic accident causing vehicle impact occurs, the levers 181 are immediately separated from the lever engagement apertures 175 and simultaneously the door core 70 is opened, and the air bag outer skin expands and forms an air bag. Accordingly, the air bag device of the present invention works very fast and is neither too early nor late in releasing during operation. The air bag device of the present invention further is easy and inexpensive to manufacture and is very simple in structure. The overall cost is substantially reduced in each embodiment when compared to prior devices, since the door 65 in each instance is reusable for an indefinite number of accidents without wear or deterioration of the component parts.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. An air bag device, comprising:

a housing having an opening, said opening being rectangular in a first state and elliptical in a second state, and an inner surface of said housing having a groove therein;

an air bag outer skin disposed in said housing;

an inflator disposed in said housing and operationally connected to said air bag outer skin for inflating said air bag outer skin;

a housing door operationally connected to said housing and including engaging means attached to an inner surface of said air bag door; and said engaging means for engaging said groove when said opening is in said first state such that said housing door covers said opening, and for disengaging said groove when said opening is in said second state.

2. The air bag device of claim 1, wherein said engaging means includes a horizontally elongated projection.

3. The air bag device of claim 2, wherein said elongated projection has an L-shaped configuration.

4. The air bag device of claim 1, wherein said opening transitions from said first state to said second state when said inflator inflates said outer air bag skin.

5. An air bag device, comprising:

a housing having an opening, and an inner surface of said housing having at least one aperture therein;

an air bag outer skin disposed in said housing;

an inflator disposed in said housing and operationally connected to said air bag outer skin for inflating said air bag outer skin;

a housing door operationally connected to said housing; and lever means, rotatably connected to an inner surface of said housing door, for engaging said at least one aperture in a first state such that said housing door covers said opening, and for disengaging said at least one aperture in a second state, said lever means transitioning from said first state to said second state when said inflator inflates said air bag outer skin.

6. The air bag device of claim 5, wherein said lever means comprises:

a shaft rotatably mounted to said inner surface of said housing door;

a lever mounted on said shaft;

a pivot plate mounted on said shaft; and means for biasing said pivot plate such that said lever means is in said first state.

7. An air bag device for use in a vehicle, comprising:

an air bag case having upper and lower walls, opposing side walls joining the upper and lower walls and an opening formed at one end of said case;

an air bag outer skin disposed within said air bag case, said air bag outer skin surrounding around a circular tube at one end thereof;

an inflator disposed within said circular tube, said inflator containing a detonating fuse for explosion of the inflator;

an air bag door operatively connected to said opening of the air bag case, said air bag door including an inner surface and an upper connecting plate extending from an upper portion thereof;

said upper connecting plate including a plurality of engagement apertures formed therein for correspondingly engaging with a plurality of projections supported on the outer surface of the upper wall of said air bag case;

a pair of spaced shaft supports disposed on an inner surface of said air bag door; and, a rotary shaft rotatably inserted into said pair of shaft supports, said rotary shaft including a pair of levers attached thereto for engaging with a corresponding pair of lever engagement apertures disposed within the lower wall of and adjacent the opening of said air bag case, and a pivotal plate attached to said rotary shaft between said pair of levers, said pivotal plate being normally biased by a spring for engaging said pair of levers with said corresponding pair of lever engagement apertures, whereby when a traffic accident causing vehicle impact occurs, the air bag outer skin explodes into an air bag against the pivotal plate and thus against said air bag door, thereby separating the pair of levers from the corresponding pair of lever engagement apertures and thus separating said air bag door from said air bag case.

8. The air bag device of claim 7, wherein said shaft supports are formed of a ring configuration for receiving said rotary shaft.

9. The air bag device of claim 7, wherein said pair of levers has an L-shaped configuration for tightly fitting within the corresponding pair of lever engagement apertures.

* * * * *